R. J. ELLEDGE.
LEATHER TIRE.
APPLICATION FILED AUG. 19, 1907. RENEWED MAY 16, 1910.
993,159.
Patented May 23, 1911.
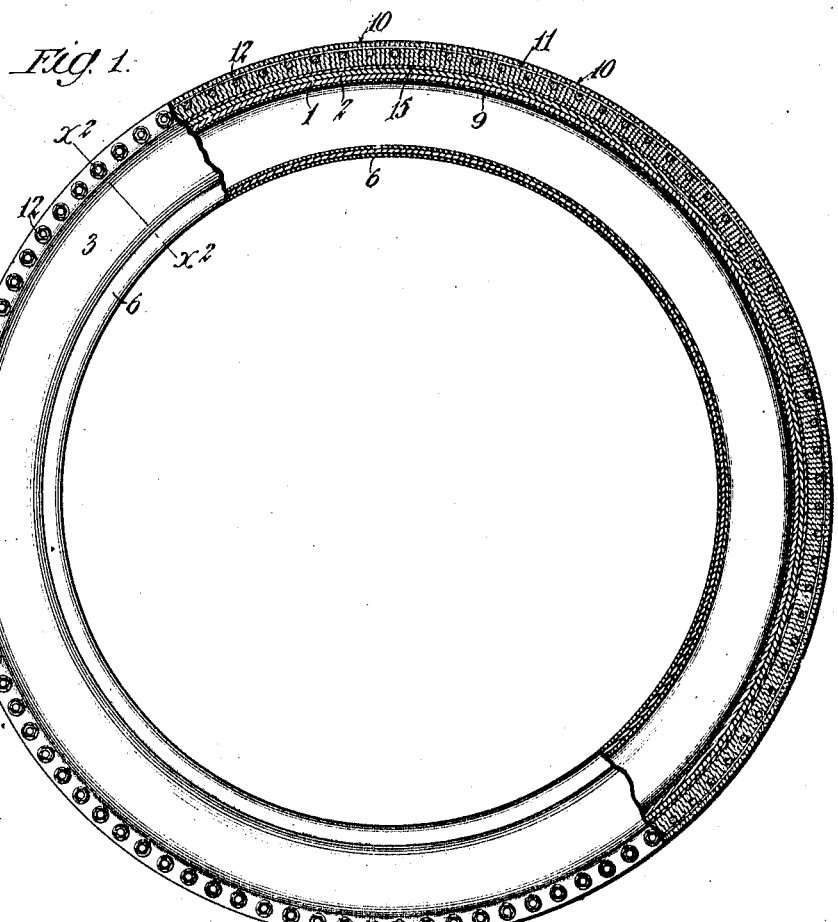
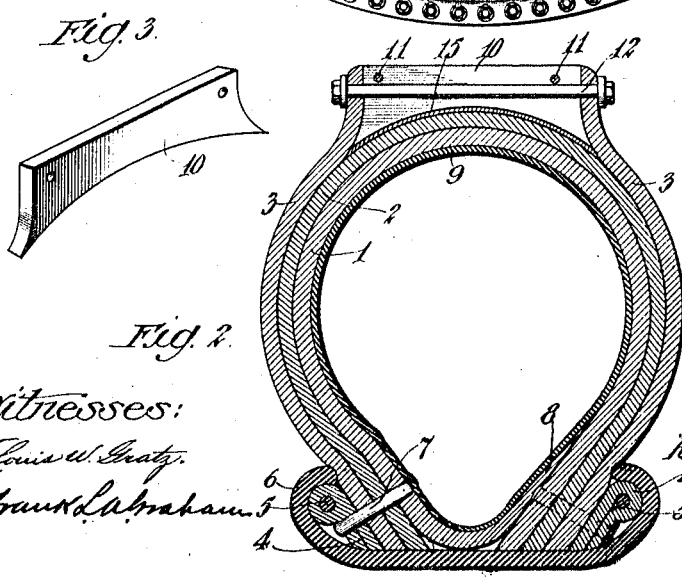

UNITED STATES PATENT OFFICE.

RAYMOND J. ELLEDGE, OF LOS ANGELES, CALIFORNIA.

LEATHER TIRE.

993,159. Specification of Letters Patent. Patented May 23, 1911.

Application filed August 19, 1907, Serial No. 389,300. Renewed May 16, 1910. Serial No. 561,769.

*To all whom it may concern:*

Be it known that I, RAYMOND J. ELLEDGE, a citizen of the United States, residing at Los Angeles, in the county of Los Angeles and State of California, have invented a new and useful Leather Tire, of which the following is a specification.

This invention relates to leather tires, and the object of the invention is to improve the construction of the same, the particular objects being to improve the tread portion of the tire and increase its wearing and tractive qualities without impairing the resiliency of the tire.

The invention consists in so constructing the tread of the tire that the edge of the leather is presented to form the wearing surface instead of the side face of the leather.

The accompanying drawings illustrate the invention and referring thereto:—Figure 1 is a side elevation of a tire partly in section, showing one form. Fig. 2 is an enlarged cross section on line $x^2$—$x^2$ Fig. 1. Fig. 3 is a perspective view of one of the tread plates.

In the form shown in Fig. 1, the tire comprises an inner layer of leather 1, an intermediate layer of leather 2 and two outer strips 3. Strips or loops 4 are curled around cords 5 near the inner edges of the outer strips 3 to form annular welts or shoulders, thus providing means of engagement with the rim 6 or fastening devices which may be employed in securing the tire to the rim. The layers 1, 2 and 3 and loops 4 may be secured together by sewing, riveting or lacing as at 7, and the inner layer 1 has a chamfered edge 8 which is adapted to rest against the opposite leaf of the inner layer 1 and present a smooth surface for the inner air tube 9. At the tread portion of the tire the two outer strips 3 diverge from the intermediate layers 2 to produce two annular flanges between which an annular groove is formed which encircles the tread portion of the tire. The annular groove thus formed is filled with pieces or plates of leather 10. These pieces may be punched with a die and each has its inner edge longer than its outer edge and concaved to correspond with the curvature of the tire, and its ends are also concaved so as to cause its inner corners to project downwardly and outwardly, and thereby give the piece such a form as to cause it to fit the annular groove in the tread. The plates 10 are arranged transversely of the tire with their flat faces together, and the inner concave edges of the pieces 10 rest upon a reinforcing strip 15, which rests upon the intermediate layer 2, the outer straight edges of the pieces 10 forming the tread portion of the tire.

In order to hold the pieces 10 in position, two or more wires or cables 11 are passed through them circumferentially around the tire, and to fasten the ring of leather pieces, thus formed in the groove, bolts 12 are employed which pass transversely through the ring of pieces 10 and pass through the outer edges of the outer strips 3, as clearly shown.

It will be observed that the tire thus formed will have exceptionally fine wearing qualities as the edge of the leathers receive the wear, and that the tractive qualities of the tread are superior on account of the edge wearing surface.

What I claim is:—

The combination of a flanged tire having an annular groove around its tread formed with a convex bottom and curved side walls diverging outwardly from the top to the bottom of the groove, of a series of tread pieces arranged side by side therein transversely of the groove and having their end and bottom edges corresponding with the side walls and bottom respectively of the groove, whereby said pieces are caused to fit said groove and fill the same, wires through said pieces circumferentially of the wheel, one near each end thereof, and bolts through said pieces transversely of the wheel and through said flanges, said bolts being between the bottom of the grooves and said wires.

In testimony whereof, I have hereunto set my hand at Los Angeles, California, this 7th day of August 1907.

RAYMOND J. ELLEDGE.

In presence of—
GEORGE T. HACKLEY,
FRANK L. A. GRAHAM.